United States Patent [19]

Smith et al.

[11] 4,086,293

[45] Apr. 25, 1978

[54] LOW ENERGY-CURABLE HIGH SOLIDS COATING COMPOSITIONS

[75] Inventors: Oliver Wendell Smith, South Charleston; Joseph Victor Koleske, Charleston, both of W. Va.

[73] Assignee: Union Carbide Corporation, New York, N.Y.

[21] Appl. No.: 690,279

[22] Filed: May 26, 1976

[51] Int. Cl.$^2$ ............................................. C08L 63/00
[52] U.S. Cl. ........................... 260/830 R; 260/830 P; 260/834; 260/835
[58] Field of Search ............................ 260/830 R, 835

[56] References Cited

U.S. PATENT DOCUMENTS

| | | | |
|---|---|---|---|
| 3,408,421 | 10/1968 | Kurka | 260/835 |
| 3,598,799 | 8/1971 | Naylor | 260/830 R |
| 3,629,361 | 12/1971 | Soldatos | 260/830 R |
| 3,739,041 | 6/1973 | Schmid | 260/835 |
| 3,741,941 | 6/1973 | Ashe | 260/830 R |
| 3,781,381 | 12/1973 | Koleske | 260/830 R |
| 3,937,751 | 2/1976 | Schmid | 260/835 |
| 3,979,477 | 9/1976 | Schmid | 260/835 |

*Primary Examiner*—Paul Lieberman
*Attorney, Agent, or Firm*—Francis M. Fazio

[57] ABSTRACT

High solids compositions, useful as inks or coatings, comprising a mixture of a polycaprolactone derivative and a polyepoxide crosslinking agent. There can optionally be present an organic isocyanate, catalyst and solvent. The polycaprolactone derivative used in the composition is the reaction product, or adduct, of a polycaprolactone polyol and an intramolecular carboxylic acid anhydride; it is water insoluble.

22 Claims, No Drawings

LOW ENERGY-CURABLE HIGH SOLIDS COATING COMPOSITIONS

BACKGROUND OF THE INVENTION

Governmental regulations have placed over increasing restrictions on the amounts and types of organic volatiles permitted to escape into the atmosphere from coatings compositions. Considerable efforts have been expended to develop coatings compositions having a minimal amount of volatile organic components and this has led to development of powder coatings, radiation curable coatings, water borne coatings and high solids coatings. In these recent developments the amounts of organic solvents present are minimal and consequently there is little or no atmospheric pollution.

In the field of solvent coatings, efforts have been made to reduce the amount of volatile solvent present and to increase the amount of component that will remain as the coating on the substrate. At a sufficiently high concentration of such components one has what is known as a high solids coating composition. These are compositions that are applied in liquid form and dry to acceptable films without the evaporation of substantial quantities of solvents. Thus, a high solids coating composition, such as the ones hereinafter described, which would serve to lower atmospheric pollution and still produce a good satisfactory coating composition would be of great importance.

SUMMARY OF THE INVENTION

It has now been found that certain water insoluble polycaprolactone derivatives can be used in conjunction with certain polyepoxide crosslinking agents to produce high solids compositions useful as inks and coatings that can be cured rapidly and efficiently and are considered low energy-curable. The water insoluble polycaprolactone derivatives are hereinafter more fully described and are the reaction produce mixtures obtained by the reaction of a polycaprolactone polyol and an intramolecular anhydride of a polycarboxylic acid. The compositions can optionally contain catalysts, organic polyisocyanates and solvents. They are applied in conventional manner and thermally cured to dry films.

DESCRIPTION OF THE INVENTION

The carboxyl modified water insoluble polycaprolactone adducts or derivatives that are blended with the polyepoxide crosslinking agents to produce the coating compositions of this invention are the adducts comprising the reaction product mixture of a polycaprolactone polyol and an anhydride of a polycarboxylic acid. As starting materials for producing the adducts one can use any of the known polycaprolactone polyols that are commercially available and that are fully described, for example, in U.S. Pat. No. 3,169,945. As described in this patent the polycaprolactone polyols are produced by the catalytic polymerization of an excess of a caprolactone and an organic polyfunctional initiator having at least two reactive hydrogen atoms. The polyols for use herein can be single compounds or mixtures of compounds and either can be used in this invention. The method for producing the polycaprolactone polyols is of no consequence and the organic functional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly(oxyethyleneoxypropylene) glycols, and similar polyalkylene glycols, either blocked, capped or heteric, containing up to about 40 or more alkyleneoxy units in the molecule, 3 methyl-1-5-pentanediol, cyclohexanediol, 4,4'-methylene-bis-cyclohexanol, 4,4'-isopropylidene bis-cyclohexanol, xylenediol, 2-(4-hydroxymethylphenyl) ethanol, 1,4 butanediol, and the like; triols such as glycerol, trimethylolpropane, 1,2,6-hexanetriol, triethanolamine, triisopropanolamine, and the like; tetrols such as erythritol, pentacrythritol, N,N,N',N'-tetrakis(2-hydroxyethyl) ethylene diamine, and the like.

When the organic functional initiator is reacted with the caprolactone a reaction occurs that can be represented in its simplest form by the equation:

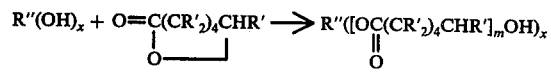

In this equation the organic functional initiator is the $R''(OH)_x$ compound and the caprolactone is the

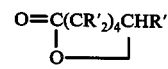

compound; this can be caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from 290 to about 6,000. The preferred polycaprolactone polyol compounds are those having an average molecular weight of from about 290 to about 3,000, preferably from about 300 to about 1,000. The most preferred are the polycaprolactone compounds having an average molecular weight of from about 375 to about 500 since they yield derivatives which impart good flexibility and hardness to the coating compositions of this invention. In the formula m is an integer representing the average number of repeating units needed to produce the compound having said molecular weights. The hydroxyl number of the polycaprolactone polyol can be from about 15 to 600, preferably from 200 to 500; and the polycaprolactone polyol can have from 2 to 6, preferably 2 to 4 hydroxyl groups.

Illustrative of polycaprolactone polyols that can be used as starting materials in the production of the water insoluble polycaprolactone derivatives used in the blends of this invention one can mention the reaction products of a polyhydroxyl compound having from 2 to 6 hydroxyl groups with caprolactone. The manner in which these polycaprolactone polyol compositions are produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units)

that reacted to produce the compound; this figure is shown in the third column.

POLYCAPROLACTONE POLYOLS

| Initiator | Average MW of polyol | Average No. of CPL Units in molecules |
|---|---|---|
| 1 Ethylene glycol | 290 | 2 |
| 2 Ethylene glycol | 803 | 6.5 |
| 3 Ethylene glycol | 2,114 | 18 |
| 4 Propylene glycol | 874 | 7 |
| 5 Octylene glycol | 602 | 4 |
| 6 Decalence glycol | 801 | 5.5 |
| 7 Diethylene glycol | 527 | 3.7 |
| 8 Diethylene glycol | 847 | 6.5 |
| 9 Diethylene glycol | 1,246 | 10 |
| 10 Diethylene glycol | 1,998 | 16.6 |
| 11 Diethylene glycol | 3,526 | 30 |
| 12 Triethylene glycol | 754 | 5.3 |
| 13 Polyethylene glycol (MW 200)* | 713 | 4.5 |
| 14 Polyethylene glycol (MW 600)* | 1,396 | 7 |
| 15 Polyethylene glycol (MW 1500)* | 2,868 | 12 |
| 16 1,2-Propylene glycol | 646 | 5 |
| 17 1,3-Propylene glycol | 988 | 8 |
| 18 Dipropylene glycol | 476 | 3 |
| 19 Polypropylene glycol (MW 425)* | 824 | 3.6 |
| 20 Polypropylene glycol (MW 1000)* | 1,684 | 6 |
| 21 Polypropylene glycol (MW 2000)* | 2,456 | 4 |
| 22 Hexylene glycol | 916 | 7 |
| 23 2-Ethyl-1,3-hexanediol | 602 | 4 |
| 24 1,5-Pentanediol | 446 | 3 |
| 25 1,4-Cyclohexanediol | 629 | 4.5 |
| 26 1,3-Bis(hydroxyethyl)-benzene | 736 | 5 |
| 27 Glycerol | 548 | 4 |
| 28 1,2,6-Hexanetriol | 476 | 3 |
| 29 Trimethylolpropane | 590 | 4 |
| 30 Trimethylolpropane | 761 | 5.4 |
| 31 Trimethylolpropane | 1,103 | 8.5 |
| 32 Triethanolamine | 890 | 6.5 |
| 33 Erythritol | 920 | 7 |
| 34 Pentaerythritol | 1,219 | 9.5 |

*=Average molecular weight of glycol.

The structures of the compounds in the above tabulation are obvious to one skilled in the art based on the information given. The structure of compound No. 7 is:

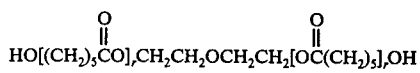

wherein the variable $r$ is an integer, the sum of $r + r$ has an average value of 3.7 and the average molecular weight is 527. The structure of compound No. 20 is:

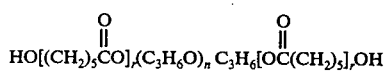

wherein the sum of $r + r$ has an average value of 6 and the average molecular weight is 1.684. This explanation makes explicit the structural formulas of compounds 1 to 34 set forth above.

The polycaprolactone polyol is reacted with a polycarboxylic acid anhydride and illustrative thereof one can mention trimellitic anhydride, tetrahydrophthalic anhydride, phthalic anhydride, benzophenone dicarboxylic acid anhydride, succinic anhydride, maleic anhydride, naphthoic anhydride, glutaric anhydride, or any other intramolecular anhydride, including those having substituents thereon such as halogen atoms, alkyl or alkoxy groups, nitro, carboxyl, aryl, or any other group which will not unduly interfere with the reaction.

The amount of polycarboxylic acid anhydride reacted with the polycaprolactone polyol can be an amount sufficient to react with all of the hydroxyl groups present in the polycaprolactone polyol. This amount will vary and can be from 0.5 to 1 anhydride equivalent for each hydroxyl equivalent or group present in the polycaprolactone polyol initially charged to the reaction mixture. Preferably from 0.85 to 0.95 anhydride equivalent per hydroxyl equivalent is used, with the most preferred ratio being 0.9 anhydride equivalent per hydroxyl equivalent. It is preferred not to have any free anhydride present in the adduct reaction mixture as it presents problems in the formulations of this invention due to its insolubility.

The polycaprolactone polyols are reacted with the polycarboxylic anhydride with or without a solvent present at a temperature of about 75° to 200° C., preferably about 100° to 140° C. The time required for reaction will vary depending upon the particular reactants charged and the batch size of the reaction mixture, facts which are well known to those skilled in the art. Generally it has been found that a reaction period in the laboratory of from 15 to 45 minutes at from about 125° to 175° C. is adequate to produce the initial water insoluble carboxyl modified oligomer addition reaction product mixture obtained by the reaction of these two intermediates.

The water insoluble adduct formed at this stage of the reaction is a viscous liquid in most instances. However, in some instances it has been observed that the product will solidify upon standing at room temperature for an extended period of time. This, however, does not detract from its further utility. Generally these modified oligomers or adducts are water insoluble but solvent soluble.

While applicants have not fully established the structures of the water insoluble adducts present in their reaction product mixture, it has been theorized that the reaction can proceed along the following route with the adduct being a complex mixture of components in which the indicated compound is predominant.

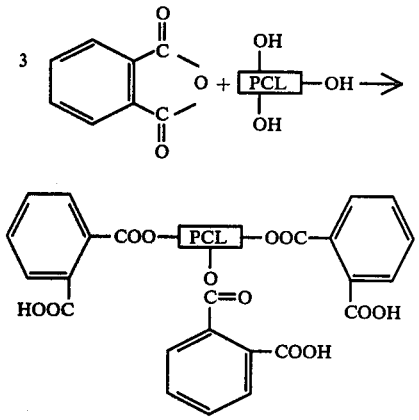

Water Insoluble Adduct

In the above, the unit

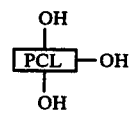

represents a polycaprolactone triol. While this theoretical explanation is presented, applicants do not intend to be bound by any theory. In this schematic a specific 1:1 ratio of anhydride to hydroxyl is shown. It is apparent from our description that it can be modified within the ratios stated previously.

One can also modify the reaction by inclusion and reaction of an organic polyisocyanate to react with a portion of the hydroxyl groups prior to reaction with the anhydride, as is shown in Example 3 hereinafter. In such instances any of the known polyisocyanates can be used such as tolylene diisocyanate, 3,5,5-trimethyl-1-isocyanato-3-isocyanatomethylcyclohexane, 4,4-diphenylmethane diisocyanate, hexamethylene diisocyanate, dicyclohexyl-4,4'-methane diisocyanate, the polymethylene polyphenylisocyanates, and the like.

In a typical reaction one normally charges a polycaprolactone polyol and the polycarboxylic acid anhydride to a reaction vessel and heats the mixture to a temperature of from about 125° to 175° C. for a period of about 20 to 30 minutes. This produces the water insoluble carboxyl modified polycaprolactone oligomer or adduct.

The low energy-curable high solids compositions of this invention comprise mixtures of (1) the water insoluble polycaprolactone adducts produced by the reaction of the polycaprolactone polyol and the intramolecular carboxylic acid anhydride and (2) a polyepoxide.

The polyepoxides that can be used in producing the compositions of this invention are well known to those skilled in the art and are fully described in U.S. Pat. No. 3,027,357, U.S. Pat. No. 2,890,194 and U.S. Pat. No. 2,890,197. Of particular interest in that portion of U.S. Pat. No. 3,027,357 beginning at column 4, line 11 to column 7, line 38, which portion and disclosure is specifically incorporated herein by reference. Among some of the specific illustrative diepoxides disclosed therein one can mention 3,4-epoxycyclohexylmethyl-3,4-epoxycyclohexane carboxylate, bis(3,4-epoxy-6-methylcyclohexyl-methyl)-adipate, bis(2,3-epoxycyclopentyl)ether, vinyl cyclohexene dioxide, 2-(3,4-epoxycyclohexyl)-5,5-spiro(2,3-epoxycyclohexane)-m-dioxane, bis (3,4-epoxycyclohexylmethyl)adipate, and the like.

The concentration of the water insoluble polycaprolactone adduct in the composition of this invention can vary from 20 to 60 weight percent, preferably from 25 to 40 weight percent, based on the combined weight of said polycaprolactone adduct and polyepoxide.

The concentration of the polyepoxide in the composition can vary from 50 to 80 weight percent, preferably 60 to 75 weight percent, based on the combined weight of said polyepoxide and polycaprolactone adduct.

There can also be present in the composition of this invention a catalyst for the reaction of the oxirane group with the carboxyl group. The catalysts are used in the conventional amounts known to those skilled in the art. Any of the known catalysts can be used and illustrative thereof one can mention stannous octoate, benzildimethylamine, tris(dimethylaminomethyl)phenol, triethylenediamine, tributylphosphine, triethylamine, uranyl nitrate hexahydrate, and the like.

The high solids curable compositions can also contain a minor amount of solvent, to assist in viscosity control. In such instances any of the known organic solvents can be used that are conventionally used in the coating and ink fields.

In addition, other crosslinkers can also be present in small amounts, such as urea formaldehyde resins, melamine formaldehyde resins, or polyisocyanates. In such instances one can include a known catalyst for this crosslinking reaction pertinent.

In the absence of any catalyst in the high solids compositions of this invention, the pot-life of the composition can be as much as 10 hours or more. The presence of a catalyst tends to hasten the cure reaction, even at ambient temperature, and generally reduces the pot-life to up to about 5 hours. It was observed, however, that the presence of a tertiary amine in an amount in excess of the equivalent amount of catalyst present for the reaction between the carboxyl and oxirane groups, served to extend the pot-life of the compositions of this invention; in some instances to as long as two days.

In view of the pot-lives of the compositions, it is preferred to prepare the desired blend of polycaprolactone derivative and polyepoxide of this invention as it is needed. This is a common and accepted procedure in commercial practice today when reactive components are involved. The blends are produced by any of the known and practiced mixing procedures used by the ink and coating compositions industry. These procedures require no further description herein to enable one skilled in the art to produce our novel compositions.

The high solids compositions of this invention can also contain colorants, pigments, dyes, fillers, fungicides, bactericides, and other additives conventionally added to coating and ink compositions, in their usual concentrations.

The coating compositions are applied to a substrate by the known conventional methods. They are cured by heating at a temperature of about 125° to 300° F., preferably from 150° to 200° F. for a period of time sufficient to obtain a dry film. Generally, this time will range from about 1 to 30 minutes, preferably from 10 to 20 minutes. The components present in a particular coating composition used will control the temperature and time that will be required to obtain an adequate cure and a good film coating.

The coatings compositions of this invention are high solids coatings compositions and they can contain as much as 80 weight percent solids therein. Generally the total solids content of the coatings compositions of this invention range from about 50 to 70 weight percent of the total weight of the composition.

The coatings compositions were evaluated according to the following procedures:

Solvent resistance is a measure of the resistance of the cured film to attack by acetone and is reported in the number of rubs or cycles of acetone soaked material required to remove one half of a film from the test area. The test is performed by stroking the film with an acetone soaked cheesecloth until that amount of film coating is removed. The number of cycles required to remove this amount of coating is a measure of the coating solvent resistance.

Reverse impact measures the ability of a given film to resist rupture from a falling weight. A Gardner Impact Tester using an eight pound dart is used to test the films cast and cured on the steel panel. The dart is raised to a given height in inches and dropped on to the reverse side of a coated metal panel. The inches times pounds, designated inch-pound, absorbed by the film without rupturing is a measure of the films reverse-impact resistance.

In this application the following definitions describe the particular compounds that are used in the examples:
Silicone Surfactant I is

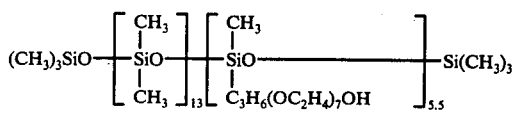

Polyol A is a polycaprolactone triol having an average molecular weight of 300 and an average hydroxyl number of 560. pl Polyol B is a polycaprolactone triol having an average molecular weight of 540 and an average hydroxyl number of 310.

Polyol C is a polycaprolactone triol having an average molecular weight of 900 and an average hydroxyl number of 187.

Polyol D is a polycaprolactone diol having an average molecular weight of 530 and an average hydroxyl number of 212.

The following examples further serve to define this invention.

EXAMPLE 1

A reaction flask equipped with a stirrer, thermometer and nitrogen inlet tube was charged with 270 grams of Polyol B and 105 grams of phthalic anhydride. The mixture was reacted under nitrogen for 30 minutes at 140° C. and a light amber, water insoluble, viscous liquid was produced as the adduct. This adduct contained residual hydroxyl groups.

A coating composition (Comp. I) was formulated by mixing 6.6 grams of the above adduct with 5.7 grams of 3,4-epoxycyclohexylmethyl 3,4-epoxycyclohexane carboxylate, 2 grams of methyl ethyl ketone and 0.05 gram of stannous octoate. Films were cast on steel panels with a No. 40 wire-wound rod and cured for 5 and 10 minutes at 350° F. Five minutes cure afforded a film that withstood 80 acetone rubs and 10 minutes cure developed greater than 100 acetone rubs. The cured films were flexible (> 320 inch pounds, reverse impact resistance), adherent, relatively hard, glossy and lost only 5 and 12 weight percent due to effluents under the curing conditions mentioned above. These coatings have good coating properties and represent cases involving mixed hydroxyl and carboxyl functionality. About half the hydroxyl groups in the polyol were modified with phthalic anhydride.

A second coating composition (Comp. II) was formulated using the same formulation as in Comp. I above and additionally containing 0.5 grams of hexamethoxymethylmelamine as crosslinking agent. Films were cast on steel panels with a No. 40 wire-wound rod and cured for 5 minutes at 350° F. to hard films that withstood 100 acetone rubs. Compared to films from Comp. I not containing the cross-linking agent, these films were harder, had similar flexibility and adhesion, and developed solvent resistance in a shorter cure cycle.

EXAMPLE 2

Following the procedure described in Example 1, a mixture of 150 grams of Polyol A and 200 grams of phthalic anhydride was reacted for 30 minutes at 130° C. A water insoluble, viscous liquid adduct was produced containing residual hydroxyl groups.

A series of coating compositions was produced, as indicated below, and cast and cured on steel panels as described in Example 1. The acetone resistance and hardness of the cured films increased as the concentration of the epoxide (ERL), which was 3,4-epoxycyclohexylmethyl 3,4-epoxycyclohexane carboxylate, increased. Each formulation contained 0.05 gram of stannous octoate.

| Adduct, g | ERL, g | MIBK, g |
|---|---|---|
| 3 | 7 | 4.75 |
| 4 | 6 | 4.5 |
| 5 | 5 | 4.25 |
| 6 | 4 | 3.0 |
| 7 | 3 | 2.75 |

MIBK = methyl isobutyl ketone

EXAMPLE 3

A reactor was charged with 116.9 grams of Polyol D, 119.1 grams of Polyol B and 0.05 gram of dibutyltin dilaurate. After heating the mixture to 50° C., 58.2 grams of 4,4'-methylene bis(cyclohexylisocyanate) were added at a rate to maintain a temperature of 55° to 60° C. The mixture was heated for 30 minutes at the completion of the isocyanate addition to ensure completion of reaction and then 105.8 grams of phthalic anhydride were added and the mixture was heated for an additional 30 minutes at 130° C. to produce a water insoluble, liquid, urethane-type adduct.

A 10 grams portion of the adduct was formulated with 3 grams of 3,4-epoxycyclohexylmethyl 3,4-epoxycyclohexane carboxylate, 0.06 gram stannous octoate, 0.08 gram Silicone Surfactant I and 4 grams of butyl acetate. Films cast on steel panels and cured for 20 minutes at 200° F. had a high gloss, excellent flexibility (more than 320 inch-pounds reverse impact resistance), solvent resistance (more than 100 acetone rubs), adhesion (100% crosshatch adhesion), and acceptable hardness (pencil hardness of HB). A similar coating formulation based on an adduct using a mixture of Polyol B and Polyol D afforded nearly identical coating properties when cross-linked with the same diepoxide under similar conditions.

A pigmented coating composition was produced by grinding a mixture of 100 grams of the adduct with 83 grams of an orange pigment and 66 grams of butyl acetate. A 27 grams portion of this pigment grind was blended with 3.5 grams of 3,4-epoxycyclohexylmethyl 3,4-epoxycyclohexane carboxylate, 0.07 gram of stannous octoate, 0.1 gram of Silicone Surfactant I and 4 grams of butyl acetate to yield a coating composition having a 68 weight percent solids content. This composition was spray coated on to urethane automobile bumpers and cured at 300° F. for 30 minutes to yield a high gloss, adherent and tough pigmented coating that did not deleteriously affect the elastomeric substrate.

EXAMPLE 4

Following the procedure described in Example 1, a mixture of 209 grams of Polyol A and 191 grams of maleic anhydride was reacted for 30 minutes at 130° C. to produce a water insoluble, viscous, liquid adduct that was essentially free of residual hydroxyl groups.

A coating composition was produced by blending 5 grams of this adduct with 5 grams of 3,4-epoxycyclohexylmethyl 3,4-epoxycyclohexane carboxylate, 5 grams of tetrahydrofurane and 0.1 gram of uranyl nitrate catalyst. The formulation was coated on to steel panels and cured overnight at room temperature to a dry, tack-free film, having high gloss and a solvent resistance of 80 acetone rubs.

EXAMPLE 5

A series of adducts was produced by reacting Polyol B with various anhydrides by the procedure described in Example 1 for a reaction period of 30 minutes. The charges used are outlined below:

| Run: Adduct | A | B | C | D | E |
|---|---|---|---|---|---|
| Polyol B, g. | 230 | 265.5 | 226 | 204 | 267 |
| Phthalic anhydride, g. | 170 | | | | |
| Maleic anhydride, g. | | 131.5 | | | |
| Hexahydrophthalic anhydride, g. | | | 174 | | |
| Trimellitic anhydride, g. | | | | 196 | |
| Succinic anhydride, g. | | | | | 133 |
| Temp., ° C. | 130 | 130 | 130 | 170 | 130 |

Each of the above adducts was formulated with bis(3,4-epoxy-6-methylcyclohexylmethyl)adipate at three different carboxyl-to-epoxy group equivalent ratios of 0.3/1, 0.5/1 and 0.7/1. Each formulation contained 0.4 weight percent (based on solids content) of Silicone Surfactant I, 20 weight percent butyl acetate and 1 weight percent stannous octoate. The formulations were cast on steel panels and cured at 200° F. for varying periods of times. The solvent resistance, in acetone rubs is set forth below; in all instances, a 5 minutes cure was inadequate.

| Formulation Containing | Acetone Rubs After Cure For | |
|---|---|---|
| | 10 minutes | 20 minutes |
| Adduct A | >100 | >100 |
| Adduct B | >100 | >100 |
| Adduct C | 21 | >100 |
| Adduct D | 0 | >100 |
| Adduct E | 0 | >100 |

EXAMPLE 6

A pigmented coating composition was produced by mixing together and then grinding 45 grams of Adduct D of Example 5, 75 grams of titanium dioxide, 105 grams of bis(3,4-epoxycyclohexylmethyl)adipate, 37.8 grams of 2-ethoxyethyl acetate, 0.75 gram of stannous octoate and 0.6 gram of Silicone Surfactant I in a ball mill overnight. The formulation was filtered through cheesecloth and its viscosity was adjusted to 202 centipoises by the addition of more 2-hydroxyethyl acetate. The coating composition was spray coated on to a substrate and cured at both 200° and 300° F. to yield films having high gloss, high flexibility, moderate hardness and good acetone resistance properties.

EXAMPLE 7

A series of coating compositions was produced by formulation of the water insoluble, liquid adduct produced in the first paragraph of Example 4 with varying amounts of bis(3,4-epoxycyclohexylmethyl)adipate to cover a range of carboxyl:epoxy group ratios of from 0.11:1 to 1:1. The compositions also contained, based on the total weight thereof, 0.5 weight percent stannous octoate, 33 weight percent ethyl acetate, and 0.06 gram Silicone Surfactant I. Films were cast and cured under different conditions to determine the effect of curing conditions on the film hardness properties. These results are tabulated below:

| Carboxyl:Epoxide Ratio | Pencil Hardness After Curing | | |
|---|---|---|---|
| | 20 min/200° F | 20 min/150° F | /days/RT |
| 0.11:1 | HB | 4B | 4B |
| 0.25:1 | H | B | 2B |
| 0.45:1 | 3H | H | B |
| 0.7:1 | 2H | F | B |
| 1:1 | H | HB | 4B |

The results show the interrelation between carboxyl-to-epoxide ratios and cure temperatures. In this particular instance, room temperature cure failed to give a satisfactory cure; however, use of a faster catalyst could yield a satisfactory film.

EXAMPLE 8

A series of coating compositions was produced by formulation of the water insoluble, liquid adduct produced in the first paragraph of Example 4 with the epoxides set forth below. In each instance 10 grams of the adduct, 5 grams of ethyl acetate, 0.1 gram of stannous octoate, 0.1 gram of triethylamine and 0.1 gram of Silicone Surfactant I were present in the formulation in addition to the epoxide identified below. The coating compositions were cast on to steel panels and the cure cycles required to achieve a solvent resistance of the dry film of 100 acetone double rubs were determined and are reported below:

| Run | Epoxide | g. | Cure Cycle | |
|---|---|---|---|---|
| | | | Minutes | cure Temp, ° F. |
| A | Diglycidyl ether of bisphenol-A | 18.6 | 20 | 300 |
| B | Triglycidyl ether of glycerine | 14.7 | 20 | 300 |
| C | Epoxidized linseed or soybean oil | 21.5 | 20 | 300 |
| D | 3,4-Epoxycyclohexylmethyl 3,4-epoxycyclohexane carboxylate | 13.2 | 10 | 150 |

EXAMPLE 9

Following the procedure described in Example 1, 314 grams of Polyol B was reacted with 86 grams of maleic anhydride to produce a water insoluble, liquid adduct.

A coating composition was formulated containing 10 grams of said liquid adduct, 5 grams of 3,4-epoxycyclohexylmethyl 3,4-epoxycyclohexane carboxylate, 3 grams of 4,4'-methylene bis(cyclohexylisocyanate), 0.04 gram of Silicone Surfactant I, 0.1 gram of stannous octoate, 0.1 gram of triethylamine and 2 grams of ethyl acetate. A film was cast on to a steel panel with a No. 60 wire-wound rod and cured at 200° F. for 20 minutes to yield a dry coating that had a solvent resistance of 100 acetone double rubs, an H pencil hardness, good impact flexibility and high gloss. Films cured at room temperature for three days had a solvent resistance of 80 acetone double rubs, a 2B pencil hardness, good impact flexibility and good gloss.

What we claim is:

1. A high solids coating composition comprising (I) from 20 to 60 weight percent of a polycaprolactone derivative and (II) from 80 to 50 weight percent of a polyepoxide; said percentages based on the combined weights of components (I) and (II); and wherein said component (I) comprises a water insoluble, carboxyl modified polycaprolactone adduct reaction product mixture produced by the reaction of (i) a polycaprolactone polyol and (ii) from 0.5 to 1 carboxylic acid anhydride equivalent for each hydroxyl equivalent present in said polycaprolactone polyol of an intramolecular anhydride of a polycarboxylic acid; and (III) a catalytic amount of catalyst sufficient to catalyze the reaction of the oxirane group with the carboxyl group.

2. A high solids composition as claimed in claim 1, wherein said polycaprolactone polyol in said polycaprolactone derivative has from 2 to 6 hydroxyl groups.

3. A high solids composition as claimed in claim 1, wherein said polycaprolactone polyol in said polycaprolactone derivative has from 2 to 4 hydroxyl groups.

4. A high solids composition as claimed in claim 1, wherein said polycaprolactone polyol in said polycaprolactone derivative has an average molecular weight of from 290 to about 3,000.

5. A high solids composition as claimed in claim 1, wherein said polycaprolactone polyol in said polycaprolactone derivative has an average molecular weight of from about 300 to about 1,000.

6. A high solids composition as claimed in claim 1, wherein said polycaprolactone polyol in said polycaprolactone derivative has an average molecular weight of from about 375 to about 500.

7. A high solids composition as claimed in claim 1, wherein said polycaprolactone polyol in said polycaprolactone derivative is a mixture of polycaprolactone polyols.

8. A high solids composition as claimed in claim 1, wherein said intramolecular anhydride is phthalic anhydride.

9. A high solids composition as claimed in claim 1, wherein said intramolecular anhydride is hexahydrophthalic anhydride.

10. A high solids composition as claimed in claim 1, wherein said intramolecular anhydride is succinic anhydride.

11. A high solids composition as claimed in claim 1, wherein said intramolecular anhydride is trimellitic anhydride.

12. A high solids composition as claimed in claim 1, wherein said intramolecular anhydride is maleic anhydride.

13. A high solids composition as claimed in claim 1, wherein component (I) is present at a concentration of from 25 to 40 weight percent and component (II) is present at a concentration of from 60 to 75 weight percent.

14. A high solids composition as claimed in claim 1, wherein there is additionally present a catalyst for the reaction of the carboxyl groups of component (I) and the oxirane groups of component (II).

15. A high solids composition as claimed in claim 1, wherein
(a) in component (I) the compound (i) is a polycaprolactone triol having an average molecular weight of 540 and an average hydroxyl number of 310 and the compound (ii) is phthalic anhydride, and
(b) component (II) is 3,4-epoxycyclohexylmethyl 3,4-epoxycyclohexane carboxylate.

16. A high solids composition as claimed in claim 1, wherein
(a) in component (I) the compound (i) is a polycaprolactone triol having an average molecular weight of 300 and an average hydroxyl number of 560 and the compound (ii) is phthalic anhydride, and
(b) component (II) is 3,4-epoxycyclohexylmethyl 3,4-epoxycyclohexane carboxylate.

17. A high solids composition as claimed in claim 1, wherein
(a) in component (I) the compound (i) is a mixture of a polycaprolactone diol having an average molecular weight of 530 and an average hydroxyl number of 212 and a polycaprolactone triol having an average molecular weight of 540 and an average hydroxyl number of 310 reacted with 4,4'-methylene bis(cyclohexylisocyanate) and the compound (ii) is phthalic anhydride, and
(b) component (II) is 3,4-epoxycyclohexylmethyl 3,4-epoxycyclohexane carboxylate.

18. A high solids composition as claimed in claim 1, wherein
(a) in component (I) the compound (i) is a polycaprolactone triol having an average molecular weight of 300 and an average hydroxyl number of 560 and the compound (ii) is maleic anhydride, and
(b) component (II) is selected from the group consisting of 3,4-epoxycyclohexylmethyl 3,4-epoxycyclohexane carboxylate, bis(3,4-epoxy-6-methylcyclohexylmethyl)adipate, the diglycidyl ether of bisphenol-A, the triglycidyl ether of glycerine and epoxidized linseed oil.

19. A high solids composition as claimed in claim 1, wherein
(a) in component (I) the compound (i) is a caprolactone triol having an average molecular weight of 540 and an average hydroxyl number of 310 and the compound (ii) is selected from the group consisting of hexahydrophthalic anhydride, succinic anhydride, trimellitic anhydride, phthalic anhydride and maleic anhydride, and
(b) component (II) is bis(3,4-epoxy-6-methylcyclohexyl)adipate.

20. A high solids composition as claimed in claim 1, wherein in component (I) from 0.85 to 0.95 carboxylic acid anhydride equivalent is reacted per hydroxyl equivalent.

21. A high solids composition as claimed in claim 13, wherein the component (I) from 0.85 to 0.95 carboxylic acid anhydride equivalent is reacted per hydroxyl equivalent.

22. A high solids composition as claimed in claim 1, wherein there is additionally present an organic polyisocyanate.

* * * * *

UNITED STATES PATENT OFFICE
CERTIFICATE OF CORRECTION

Patent No. 4,086,293   Dated April 25, 1978

Inventor(s) O.W. Smith et al

It is certified that error appears in the above-identified patent and that said Letters Patent are hereby corrected as shown below:

Column 10, line 2:

"/days/RT" should read ---7 days/RT---

Signed and Sealed this

Fifth Day of September 1978

[SEAL]

Attest:

RUTH C. MASON
*Attesting Officer*

DONALD W. BANNER
*Commissioner of Patents and Trademarks*